United States Patent
Brawley et al.

(10) Patent No.: US 6,527,347 B2
(45) Date of Patent: Mar. 4, 2003

(54) SCRAPING APPARATUS FOR A TRACK IDLER

(75) Inventors: Michelle L. Brawley, Princeville, IL (US); John A. Brossart, III, Dunlap, IL (US); Stewart A. Langewisch, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/091,107

(22) Filed: Mar. 5, 2002

(65) Prior Publication Data

US 2002/0195875 A1 Dec. 26, 2002

Related U.S. Application Data

(60) Provisional application No. 60/300,008, filed on Jun. 21, 2001.

(51) Int. Cl.[7] .............................................. B62D 55/088
(52) U.S. Cl. ...................................... 301/110; 301/107
(58) Field of Search ................................. 305/100, 107, 305/110, 108, 109, 115; 280/855, 856; 404/129

(56) References Cited

U.S. PATENT DOCUMENTS

| | | | | |
|---|---|---|---|---|
| 3,861,762 A | * | 1/1975 | Freedy et al. ................ | 280/855 |
| 4,830,439 A | * | 5/1989 | Collins et al. ............... | 305/110 |
| 5,226,703 A | * | 7/1993 | Norman ....................... | 305/107 |
| 5,370,451 A | * | 12/1994 | Brownlee et al. ........... | 305/100 |
| 5,697,683 A | * | 12/1997 | Arulandu et al. ............ | 305/107 |
| 5,713,644 A | * | 2/1998 | Freeman ...................... | 305/100 |
| 5,725,292 A | * | 3/1998 | Keedy et al. ................ | 305/107 |
| 6,045,201 A | * | 4/2000 | Chappell et al. ............. | 305/107 |
| 6,089,684 A | * | 7/2000 | Bergstrom et al. .......... | 305/100 |
| 6,196,645 B1 | * | 3/2001 | Bergstrom et al. .......... | 305/107 |

* cited by examiner

*Primary Examiner*—S. Joseph Morano
*Assistant Examiner*—Long Bao Nguyen
(74) *Attorney, Agent, or Firm*—Calvin E Glastetter

(57) ABSTRACT

In the operation of a track chain assembly a high degree of wear is normally experienced due to the environment in which a track-type machine must operate. This wear is typically accelerated by foreign matter that is carried by an idler member of the track chain assembly and is permitted to remain on its contact surfaces as they engage the other track chain components. The present invention provides a scraper assembly that defines a plurality of scraping portions that are adapted to carry a scraping insert on an end portion thereof. The scraping inserts are continuously urged into engagement with the contact surfaces of the idler to remove foreign material therefrom before the contact surfaces engage other track chain components.

5 Claims, 3 Drawing Sheets

Fig_3_
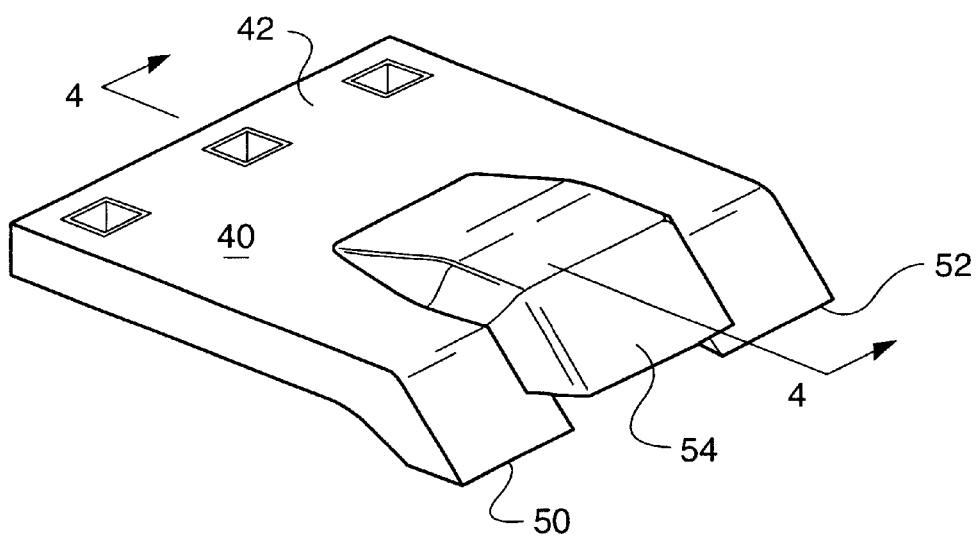
Fig_4_
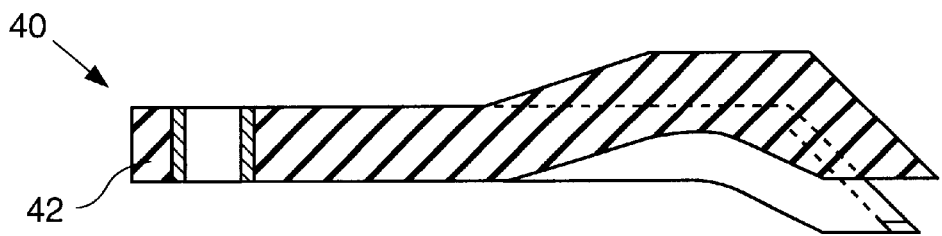

SCRAPING APPARATUS FOR A TRACK IDLER

This application claims the benefit of prior provisional patent application Ser. No. 60/300,008, filed Jun. 21, 2001.

TECHNICAL FIELD

This invention relates to a scraping apparatus for a track assembly and more particularly to a scraping assembly that will remove foreign matter from the idler member of a track assembly.

BACKGROUND

It is very common for construction machines to be operated in very hostile environments, especially those propelled by the use of track assemblies. In most instances the machine, such as a track-type tractor for instance, will be operated over all types of soil in a variety of conditions that includes mud, dust, and sand. The track assemblies by nature of their design are subjected to a high degree of wear. The wear is greatly accelerated when operated in certain types of soils such as sand, tar sand or other well-known abrasive materials.

During the operation of the track-type machine, the track links and track shoes pickup materials as they contact the ground and carry it upward, over the lower run of the track assembly as the track chain rotates. When in the elevated position, the debris becomes loosened from the upper track components and drops down onto the lower run of the track. When this occurs, the debris often falls on the contact surfaces, or wear surfaces, of the various track chain components. When this material is gritty or naturally abrasive, the wear, due to the constant contact between the surfaces, is greatly accelerated. The wear surfaces of particular concern include the wear rails of the track links and the tread portions of the track rollers and the track idler.

Because of this long standing problem several attempts have been made to provide various scaper and/or guard assemblies to prevent the build up of material on the track chain components or to deflect the debris away from critical areas. While some of these designs have been known to operate with some success, the overall mass of the guarding components is often excessive, adding to the weight and cost of the machine. The same can be said with some scraper designs, which, in many cases, are relatively intricate. In some instances, the designs incorporate a detailed profile that matches that of one or more track chain components and functions to remove material from various components as they rotate during the operation of the machine. These types of designs add significantly to the cost of the manufacture, it also adds to the cost of the replacement parts.

The present invention is directed to overcoming one or more of the problems set forth above.

SUMMARY OF THE INVENTION

In one aspect of the present invention, a scraping apparatus is provided for a track assembly. The scraping apparatus includes a frame and an idler rotatably mounted to the frame. The idler has an upraised center portion and a pair of contact surfaces positioned on opposite sides of the center portion. The idler is mounted to the frame in a manner wherein the contact surfaces are positioned for engagement with the track assembly. A scraper assembly is provided that includes a first end portion and a second end portion. The first end portion defines a pair of spaced scraping portions aligned and positioned to interact with the contact surfaces of the idler. The first end portion defining an upraised portion continuously formed with the pair of scraping portions. The upraised portion of the scraper assembly conforms to the upraised center portion of the idler. The second end portion of the scraper assembly is mounted to the frame.

BRIEF DESCRIPTION OF THE DRAWINGS

FIG. 3, is a diagrammatic isometric view of the scraper pad of the present invention shown removed from its mounting on the track assembly; and FIG. 4, is a diagrammatic cross-sectional view of the present invention taken along line 4—4 of FIG. 3.

DETAILED DESCRIPTION

Figure 1:
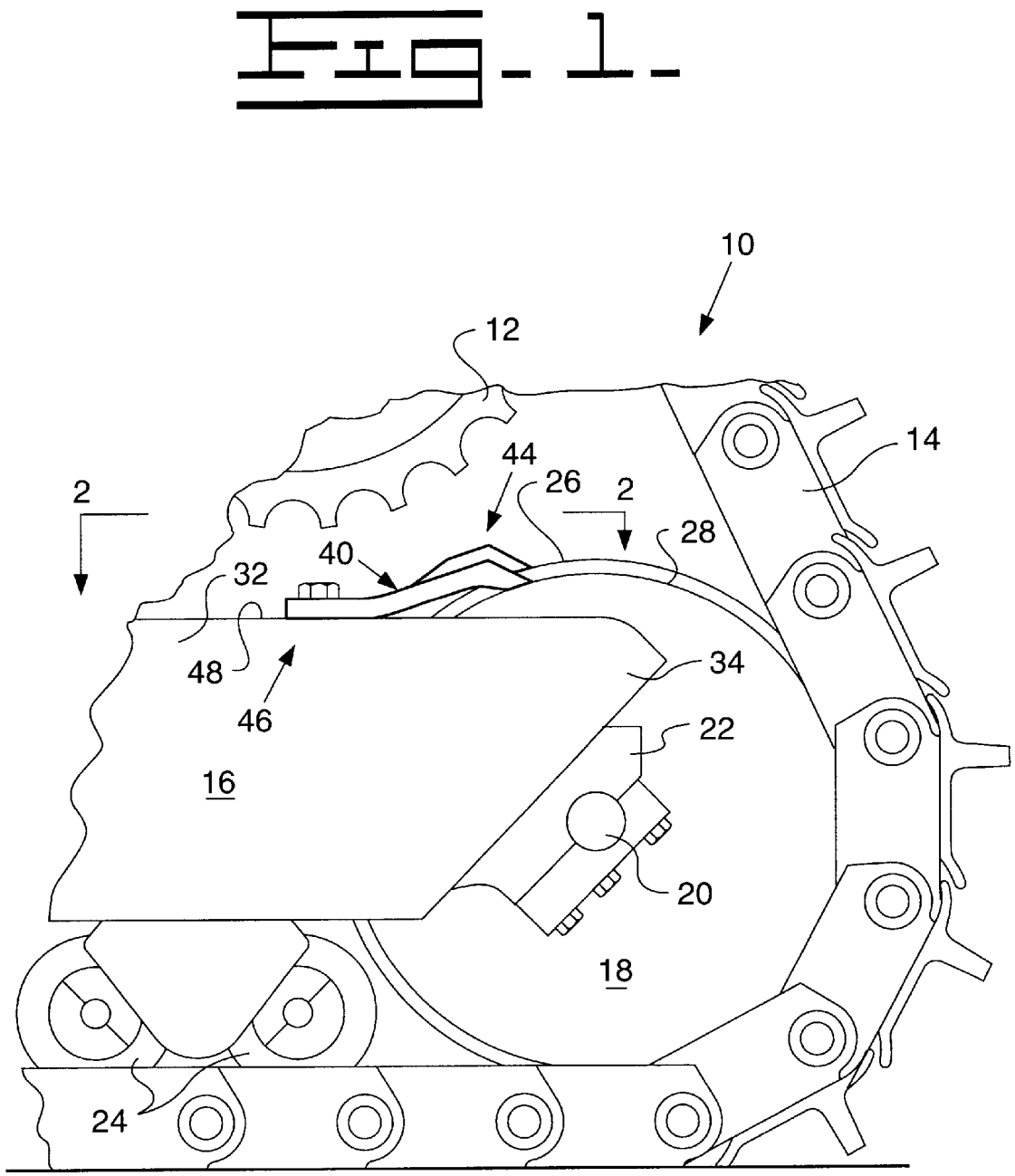
FIG. 1, is a fragmentary, diagrammatic side view of a portion of a track assembly that embodies the principles of the present invention.

Referring now to the drawings, in particular to FIG. 1, it can be seen that a portion of a track-type construction machine 10 is shown. The machine 10 includes a track assembly of well-known construction that includes a sprocket 12 is mounted to a drive train (not shown) and rotated in a conventional manner. The sprocket 12 is engageable with a track chain assembly 14 of conventional construction to provide motive traction between the ground and the machine 10 to propel the machine 10 over the ground. The track chain assembly 14 is supported by a track roller frame 16 that mounts at least an idler 18. The idler 18 is mounted for rotation about a mounting shaft 20 that is defined on a bogie arm 22 that is pivotally mounted to the track roller frame 16 for movement relative thereto. While not shown in the instant illustration, it is to be understood that a second idler could be mounted on an opposing end portion of the track roller frame. A plurality of track rollers 24 are mounted to the track roller frame 16 in a conventional manner and are positioned adjacent the idler 18. The track chain assembly 14 is entrained about and supported by the sprocket 12, the idler 18 and the track rollers 24. When rotated by the sprocket 12, the track chain assembly rotates about these components in rolling contact therewith, when the machine is moved in either direction.

The idler 18 defines an upraised center portion 26 and a pair of contact surfaces 28 and 30 that are positioned on opposite sides of the center portion 26. The center portion is positioned centrally with respect to the track chain assembly 14 to serve as a guide member while the contact surfaces engage portions of the spaced track links (not shown) defined by the track assembly. As previously set forth, the idler 18 is mounted on an end portion 32 of the track roller frame 16. The end portion 32 of the track roller frame is bifurcated to define a pair of spaced apart arms 34 and 36. The idler 18 is positioned between the arms 34 and 36 defined by the track roller frame. Idler 18 is rotatably mounted about an axis that is transversely positioned with respect to the respective pairs of bifurcated arms 34 and 36.

Figure 2:
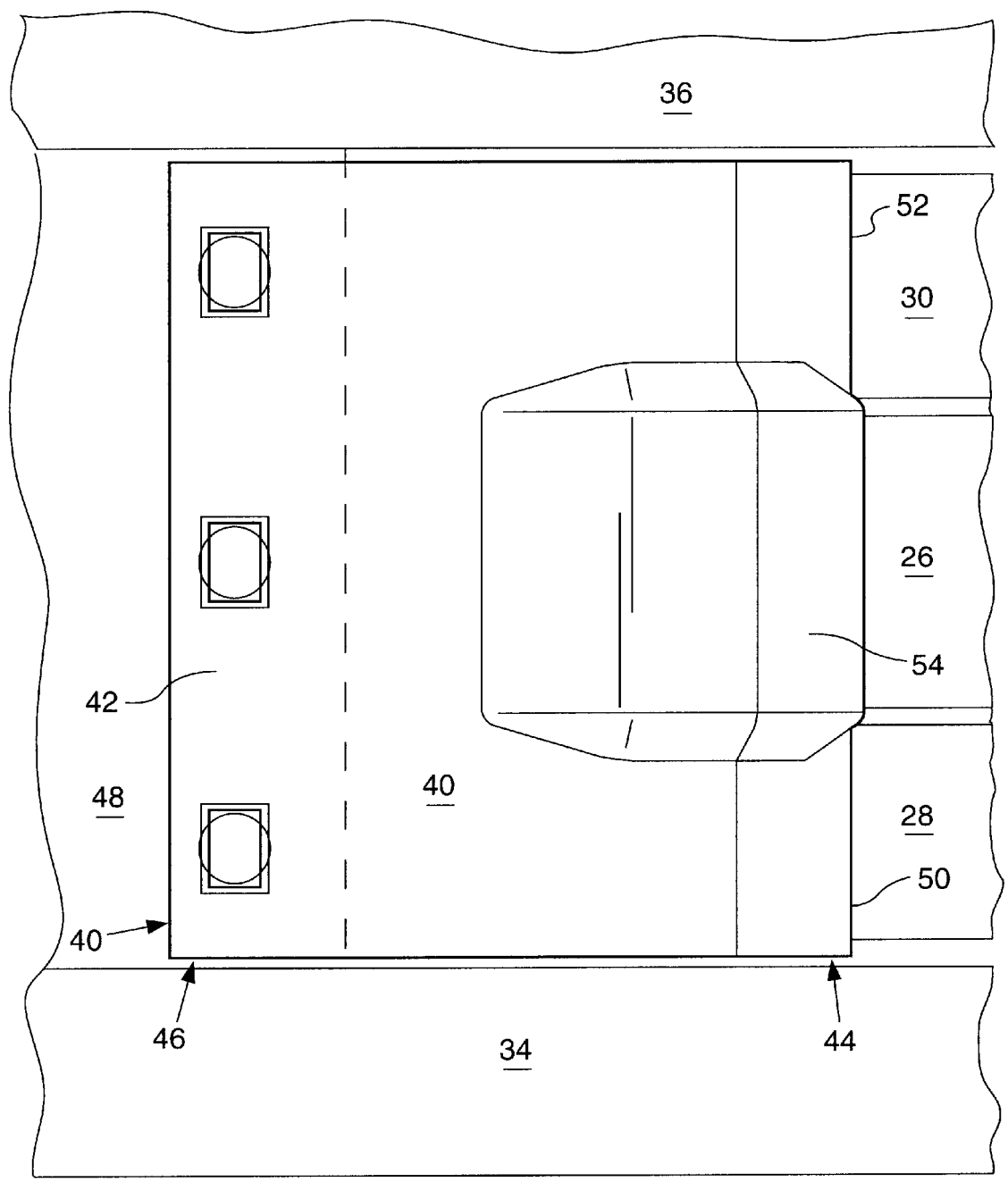
FIG. 2, is diagrammatic top view of FIG. 1 taken along line 2—2 of FIG. 1.

Referring to FIGS. 2 and 3, a scraper assembly 40 is shown in operative engagement with the idler 18. The scraper assembly 40 includes a continuous elastomeric scraper pad 42. The scraper pad 42 has a first end portion 44 and a second end portion 46 that is mounted to an upper portion 48 of the track roller frame 16. The scraper pad 42 having a first scraping portion 50, a second scraping portion 52 and an upraised portion 54. The first and second scraping portions and the upraised portion being continuously formed.

The scraper pad 42 is mounted adjacent to the idler 18 so that the first and second scraping portions 50, 52 are aligned with and in continuous engagement with the contact surfaces 28 and 30 respectively. Likewise, the upraised portion 54 is aligned with the upraised center portion 26 of the idler 18.

Industrial Applicability

In operation of a track assembly, the track chain assembly 14 is rotated around the track roller frame 16 by the drive provided by the sprocket 12.

As it rotates, the track chain assembly is engaged by the idler 18 as well as the track rollers 24 positioned adjacent thereto. The engagement between the idler and the track chain occurs primarily along the contact surfaces 28 and 30 defined by the idler 18.

As the track chain assembly 14 rotates, the components in the track chain assembly above the idler tend to shed foreign matter on the contact surfaces 28 and 30 of the idler as well as the upraised center portion 26 that is provided therebetween. The foreign matter also may find its way to the rollers 24 since there is normally an opening that exists between the track roller frame and the mounting of the idler 18. This may happen when the idler is rotated in either direction.

The scraper assembly 40 acts in two ways to reduce the amount of foreign matter that will be interposed between the areas of contact of various track chain components. First of all the scraper assembly 40 extends across the opening between the idler and the track roller frame and provides a shield for the track chain components so that the foreign matter falling from the track chain components above the idler will not fall on these components before they engage the idler. Secondly, this falling matter is removed from the contact surfaces of the idler. The scraping portions 50,52 bear against the contact surfaces of the idler and removes the foreign matter as the idler rotates. Once again the removal of the foreign material occurs before it reaches the rollers and other areas of the track chain that engage the contact surfaces of the idler. This is especially critical since the wear in this area is most severe. With the removal of this material, the wear that would normally occur between these surfaces is greatly reduced in most instances and substantially eliminated in others.

Since the second end portion 46 of the scraper pad 40 is mounted to the track roller frame 16 at an elevation that is lower than that of the first end portion 44, or scraping surfaces 28,30, a slight bend is imparted into the scraping pad. Since the scraping pad tends to seek its normally flat condition, the scraping portions 50,52 are urged into engagement with the respective surfaces of the idler 18. This is especially important when the idler is moved up and down with respect to the track roller frame as the machine traverses uneven terrain. Since the scraping portions 50,52 are biased into contact with the idler, they will follow the movement of the idler and maintain their contact therewith, thus maintaining substantially continuous contact. In doing so, the performance of the scraper is greatly enhanced and the wear of the track chain components is reduced to an even greater extent.

With a scraping apparatus as set forth above, it can be seen that a scraping assembly is provided to continuously engage the outer surfaces of the idler of a track assembly. In doing so, debris that is carried by the idler will be removed through contact with the scraping assembly as the idler rotates. This effectively prevents the debris from remaining on the contact surfaces of the idler during their engagement with the track assembly thereby avoiding unnecessary and accelerated wear of the track components.

Other aspects, objects and advantages of this invention can be obtained from a study of the drawings, the disclosure and the appended claims.

What is claimed is:

1. A scraping apparatus for a track assembly, comprising:
   a frame;
   an idler having an upraised center portion and a pair of contact surfaces positioned on opposite sides of the upraised center portion, the idler being rotatably mountable to the frame in a manner wherein the contact surfaces are positioned for engagement with the track assembly;
   a scraper assembly having a first end portion and a second end portion, the first end portion defining a pair of spaced scraping portions aligned and positioned to interact with the contact surfaces of the idler, the first end portion further defining an upraised portion continuously formed with the pair of scraping portions, the upraised portion conforms to the upraised center portion of the idler, the second end portion being mounted to the frame.

2. The scraping apparatus as set forth in claim 1, wherein the scraper assembly further includes an elastomeric scraping pad having the upraised portion integral and continuous with the pair of spaced scraping portions.

3. The scraping apparatus as set forth in claim 2, wherein the pair of scraping surfaces defined by the scraping pad have scraping inserts affixed thereto, the scraping inserts being adapted for contact with respective contact surfaced defined by the idler.

4. The scraping apparatus as set forth in claim 3, wherein the scraping inserts are made of metal.

5. The scraping apparatus as set forth in claim 2, wherein the elastomeric pad is mounted to an upper surface of the frame.

* * * * *